(12) United States Patent
Dubief et al.

(10) Patent No.: US 12,232,518 B2
(45) Date of Patent: Feb. 25, 2025

(54) APPARATUS AND METHOD FOR ROASTING COFFEE BEANS

(71) Applicant: SOCIETE DES PRODUITS NESTLE S.A., Vevey (CH)

(72) Inventors: Flavien Dubief, Champagne (CH); Stefano Ceccaroli, Chavornay (CH); Nicolas Bigler, Morrens (CH)

(73) Assignee: Societe des Produits Nestle S.A., Vevey (CH)

( * ) Notice: Subject to any disclaimer, the term of this patent is extended or adjusted under 35 U.S.C. 154(b) by 764 days.

(21) Appl. No.: 17/416,576

(22) PCT Filed: Dec. 19, 2019

(86) PCT No.: PCT/EP2019/086214
§ 371 (c)(1),
(2) Date: Jun. 21, 2021

(87) PCT Pub. No.: WO2020/127668
PCT Pub. Date: Jun. 25, 2020

(65) Prior Publication Data
US 2022/0079205 A1    Mar. 17, 2022

(30) Foreign Application Priority Data
Dec. 21, 2018 (EP) .................... 18215331

(51) Int. Cl.
*A47J 42/52* (2006.01)
*A23F 5/04* (2006.01)
(Continued)

(52) U.S. Cl.
CPC .............. *A23N 12/125* (2013.01); *A23F 5/04* (2013.01); *A23N 12/08* (2013.01); *A47J 42/52* (2013.01)

(58) Field of Classification Search
CPC ........... A47J 31/42; A47J 42/52; A23N 12/08; A23N 12/083; A23N 12/125; A23F 5/04
See application file for complete search history.

(56) References Cited

U.S. PATENT DOCUMENTS 6,053,093 A * 4/2000 Gerhardt ................ A23N 12/08
34/594
11,006,652 B2 * 5/2021 Shi ............................ A23F 5/04
(Continued)

FOREIGN PATENT DOCUMENTS

CN         1278705 A        1/2001
CN       102232797 A       11/2011
(Continued)

OTHER PUBLICATIONS

"Advanced Mathematics (vol. I)", Edition 2, May 31, 2021, pp. 124-127.
Office action received for Chinese application No. 201980085179.6, mailed on Oct. 8, 2022, 16 pages (4 pages of English Translation and 12 pages of Official Copy).

*Primary Examiner* — Reginald Alexander
(74) *Attorney, Agent, or Firm* — K&L Gates LLP

(57) ABSTRACT

The invention concerns an apparatus for roasting coffee beans comprising: —a vessel (1) to contain coffee beans, —a heating device (12) to heat coffee beans contained in the vessel, —a control system (180) operable to control the heating device and configured to apply a roasting recipe (R) providing the temperature $T_{@t1}$, $T_{@t2}$, ... to be applied at discrete successive times $t_1$, $t_2$, ..., respectively, wherein for a customised quantity m of coffee beans introduced inside the vessel, —the control system is configured to obtain at least the quantity m of coffee beans introduced inside the vessel, and —the control system is configured to get access to at least one series of roasting recipes ($R_i$, $R_{i+1}$, ... ) adapted to the roasting of different successive pre-determined quantities ($M_i$, $M_{i+1}$, ... ) of beans of same type and to said pre-determined quantities Mi, Mi+1, ... , and (Continued)

—based on said accessible series of roasting recipes ($R_i$, $R_{i+1}$, ...) adapted to the roasting of different successive pre-determined quantities ($M_i$, $M_{i+1}$, ...) of beans of same type and based on said obtained quantity m of coffee beans introduced inside the vessel, the control system is configured to determine the roasting recipe (R) to be applied on said obtained quantity m of coffee beans introduced inside the vessel.

9 Claims, 5 Drawing Sheets

(51) Int. Cl.
*A23N 12/08* (2006.01)
*A23N 12/12* (2006.01)

(56) References Cited

U.S. PATENT DOCUMENTS

| | | |
|---|---|---|
| 11,439,156 B2 * | 9/2022 | Voges ............... A23N 12/125 |
| 2004/0074400 A1 | 4/2004 | Song |
| 2014/0314923 A1 | 10/2014 | Sewell et al. |
| 2017/0164634 A1 * | 6/2017 | Tan ..................... A23N 12/12 |

FOREIGN PATENT DOCUMENTS

| | | |
|---|---|---|
| CN | 105431058 A | 3/2016 |
| TW | M537809 U | 3/2017 |
| WO | 9923888 | 5/1999 |
| WO | 2006034203 | 3/2006 |
| WO | 2015162021 | 10/2015 |
| WO | 2016083148 | 6/2016 |

* cited by examiner

APPARATUS AND METHOD FOR ROASTING COFFEE BEANS

CROSS REFERENCE TO RELATED APPLICATIONS

The present application is a National Stage of International Application No. PCT/EP2019/086214, filed on Dec. 19, 2019, which claims priority to European Patent Application No. 18215331.2, filed on Dec. 21, 2018, the entire contents of which are being incorporated herein by reference.

FIELD OF THE INVENTION

Field of the Invention

The present invention relates to the roasting coffee beans with heated air, and more specifically to the roasting of different quantities of coffee beans, particularly suited for use in the home or in shops and cafes.

BACKGROUND OF THE INVENTION

For the last decades, numerous roasters have been developed for use in the home or in small shops and coffees. Most of the roasters are based on fluidized bed technology implementing a hot air fluid bed chamber. Within such a chamber, heated air is forced through a screen or a perforated plate under the coffee beans with sufficient force to lift the beans. Heat is transferred to the beans as they tumble and circulate within this fluidized bed. Derived from an industrial roaster described in U.S. Pat. No. 3,964,175 (Sivetz), this technology has been adapted in small domestic devices like U.S. Pat. Nos. 4,484,064, 4,494,314, 4,631,838, 4,968,916, 5,269,072, 5,564,331, . . . and today, most of these roasters implement automatic roasting processes with roasting profiles stored in the control unit of the apparatus.

Whereas the roasting chamber of home devices is usually sized to hold a small quantity of coffee beans that is systematically filled at each roasting operation, devices for small shops and coffees are usually sized at an upper scale enabling the operator to roast beans for a large or a small number of consumers alternatively, depending on the demand. For example, the roasting chamber can be sized to enable the roasting of a quantity of coffee beans ranging from 50 g to 300 g.

The roasting parameters—essentially time, temperature—cannot be the same for different quantities of beans to be roasted. Otherwise, when the quantity of beans diverts significantly from the standard usual quantity, the quality of the roasting can be adversely affected: beans can become burnt or the desired degree may not be reached or the beans may not be uniformly roasted, or may not provide the optimal sensory profile.

US 2004/074400 describes a roasting apparatus wherein the roasting parameters can be adapted depending on weights and types of beans. In particular, a standard roasting curve can be adapted based on the weight of coffee beans introduced inside the roaster. Yet it is not explained what this standard roasting curve represents and how it is adapted to different types of beans.

US 2014/0314923 describes a roasting apparatus wherein roasting profiles are stored and wherein the controller is operative to calculate an optimum roasting profile based upon information concerning coffee to be roasted like weight and type of beans. Yet no description of this calculation is provided.

SUMMARY OF THE INVENTION

An object of the present invention is to improve the automatic roasting of coffee beans.

It would be advantageous to provide a roasting apparatus enabling optimal roasting whatever the quantity of beans to roast.

It would be advantageous to provide a roasting apparatus applying automatically the roasting profile corresponding to the quantity of beans introduced in the apparatus.

Objects of the invention are achieved by the apparatus for roasting coffee beans disclosed herein, the system disclosed herein, the method disclosed herein and the computer program disclosed herein.

In a first aspect of the invention, there is provided an apparatus for roasting coffee beans comprising:
- a vessel to contain coffee beans,
- a heating device to heat coffee beans contained in the vessel,
- a control system operable to control the heating device and configured to apply a roasting recipe (R) providing the temperature $T_{@t1}$, $T_{@t2}$, . . . to be applied at discrete successive times $t_1$, $t_2$, . . . respectively, wherein, for a customised quantity m of coffee beans introduced inside the vessel,
- the control system is configured to obtain at least the quantity m of coffee beans introduced inside the vessel, and
- the control system is configured to get access to
  - at least one series of roasting recipes ($R_i$, $R_{i+1}$, . . . ) adapted to the roasting of different successive pre-determined quantities ($M_i$, $M_{i+1}$, . . . ) of beans of same type, and
  - to said pre-determined quantities $M_i$, $M_{i+1}$, . . . , and
- based on said accessible series of roasting recipes ($R_i$, $R_{i+1}$, . . . ) adapted to the roasting of different successive pre-determined quantities ($M_i$, $M_{i+1}$, . . . ) of beans of same type and based on said obtained quantity m of coffee beans introduced inside the vessel, the control system is configured to determine the roasting recipe (R) to be applied on said obtained quantity m of coffee beans introduced inside the vessel.

The roasting apparatus comprises a vessel to contain coffee beans during the roasting process. In the vessel coffee beans are heated and preferably mixed to homogenise heating through the beans.

Mixing can be obtained with a fluidic bed of hot air or mechanically with stirring blades or through rotation of a rotating drum.

Preferably the vessel is hot air fluid bed chamber. Within such a vessel, heated air is forced through a screen or a perforated plate under the coffee beans with sufficient force to lift the beans. Heat is transferred to the beans as they tumble and circulate within this fluidized bed.

Alternatively the vessel can be a drum chamber wherein the coffee beans are tumbled in a heated environment. The drum chamber can consist of a horizontal rotating drum or the drum chamber can comprise stirring blades to tumble the coffee beans in a heated environment.

The roasting apparatus comprises a device to heat coffee beans contained in the vessel.

Preferably, the heating device is configured to produce a flow of hot air, said flow of hot air being directed to the coffee beans contained in the vessel in order to heat them. Usually, the heating device comprises at least an air driver and a heater to heat the flow of air produced by the air driver.

As a source of heat, preferably the apparatus comprises an electrical heater. This electrical heater is usually an electrical resistance. An electrically powered heater presents the advantage that the air pollutants produced during the roasting are pollutants generated from the heating of coffee beans themselves and not from the burning of gases as it happens when the source of heating is a gas burner using natural gas, propane, liquefied petroleum gas (LPG) or even wood.

The apparatus comprises a control system operable to control the heater and configured to apply a roasting recipe. This roasting recipe (R) provides the temperature $T_{@t1}$, $T_{@t2}$, . . . to be applied at discrete successive times $t_1$, $t_2$, . . . respectively of the roasting process. This roasting receipt is usually represented as a temperature versus time profile.

Usually, this control is implemented based on the measure of at least one temperature sensor positioned in the vessel in feedback loop control.

Control is applied on the heating device, generally on the heater and/or on the air driver.

When a quantity m of coffee beans is introduced inside the vessel, the control system is configured to obtain at least the quantity m of coffee beans introduced inside the vessel.

The quantity can be the weight or alternatively the volume or level of coffee beans present in the vessel. Preferably, the quantity is weight quantity.

When a customised quantity m of coffee beans is introduced inside the vessel, the control system of the apparatus is configured to determine the roasting recipe R adapted for this specific quantity m of coffee beans.

The control system enables the roasting of any quantity of beans, in particular quantities for which no roasting recipe has been previously determined or is accessible to by the control system.

With the present apparatus, in the case of such a new quantity, the control system of the apparatus is configured to determine a roasting profile adapted to the customised quantity.

The control system of the apparatus is configured to get access to at least one series of roasting recipes ($R_i$, $R_{i+1}$, . . . ) adapted to the roasting of different successive pre-determined quantities ($M_i$, $M_{i+1}$, . . . ) of beans of same type, that is in one series, all the roasting recipes are adapted to the roasting of the same beans, the single difference between the recipes being the weight of said beans. These different pre-determined quantities can be set to cover different quantities between a minimum quantity and a maximum quantity able to be roasted inside the apparatus. Preferably, the differences between two different successive pre-determined quantities are the same from said minimum quantity to said maximum quantity.

In addition, the control system of the apparatus is configured to get access to the pre-determined quantities ($M_i$, $M_{i+1}$, . . . ) associated to each roasting recipe ($R_i$, $R_{i+1}$, . . . ) respectively of the series. Preferably, the quantities ($M_i$, $M_{i+1}$, . . . ) are weight quantities.

The different roasting recipes ($R_i$, $R_{i+1}$, . . . ) adapted to the roasting of different pre-determined quantities of beans are usually defined by experimentation. Each of these recipes corresponds to the roasting of one pre-determined quantity of beans, all the beans of said pre-determined quantity being of the same type. Generally, the roasting recipes are defined with a common type of coffee beans like Arabica coffee beans but, in a preferred embodiment, different series of roasting recipes are defined for different types of coffee beans and the control system is able to take into account the type of beans introduced inside the vessel to get access to the series of roasting recipes associated to this specific type of beans as will be further described below.

Based on the obtained quantity m of coffee beans introduced inside the vessel and based on the series of roasting recipes and their associated pre-determined quantities, the control system is configured to determine the roasting recipe (R) to be applied on said obtained quantity m of coffee beans introduced inside the vessel.

Advantageously objects of the invention are solved since the access to a series of different recipes defined for different pre-determined quantities of beans enables the determination of a new recipe based on said existing recipes. As a result, whatever the quantity of beans introduced inside the vessel, a new recipe can be determined that guarantees a correct roasting operation.

Preferably, the control system is configured to determine said roasting recipe (R) to be applied on said quantity m of coffee beans introduced inside the vessel from one or two recipes of the at least one accessible series of roasting recipes ($R_i$, $R_{i+1}$, . . . ),
each of said one or two recipes being adapted to the roasting of one pre-determined quantity of beans respectively and said pre-determined quantity (in case of determination from one recipe) or quantities (in case of determination from two recipes) of beans presenting the smallest difference of quantity (in case of determination from one recipe) or of quantities (in case of determination from two recipes) with the obtained quantity m.

Accordingly, the new recipe is calculated from one existing recipe or from two existing recipes that present the pre-determined quantities that are the closest to the new customised quantity of beans.

From the obtained quantity m and the accessible successive pre-determined quantities $M_i$, $M_{i+1}$, . . . of the existing recipes, the control system is configured to determine the roasting recipe (R) to be applied on the quantity m of coffee beans:
  either from the roasting recipe ($R_i$) adapted to the roasting of the pre-determined quantity ($M_i$) of beans that presents the smallest difference of quantity with the obtained customised quantity m,
  or from the two roasting recipes ($R_i$, $R_{i+1}$) adapted to the roasting of successive pre-determined quantities ($M_i$, $M_{i+1}$) of beans, said successive pre-determined quantities surrounding the obtained customised quantity m.

In one first embodiment, the control system is configured to determine the roasting recipe (R) to be applied on said quantity m of coffee beans introduced inside the vessel by selecting one of the recipes of the at least one accessible series of roasting recipes ($R_i$, $R_{i+1}$, . . . ), said selection consisting in identifying the roasting recipe ($R_i$) adapted to the roasting of a pre-determined quantity ($M_i$) of beans, said pre-determined quantity of beans of beans presenting the smallest difference of quantity with the obtained customised quantity m.

In one second embodiment, the control system is configured to determine said roasting recipe (R) to be applied on said quantity m of coffee beans introduced inside the vessel by:
  identifying in said at least one series of roasting recipes the two roasting recipes $R_i$ and $R_{i+1}$ adapted to the roasting of two successive pre-determined quantities $M_i$ and $M_{i+1}$ of beans wherein the quantity m is comprised between these two successive pre-determined quantities $M_i$ and $M_{i+1}$, from said two identified roasting recipes $R_i$ and $R_{i+1}$ respectively, providing the temperatures $T_{Mi@t1}$, $T_{Mi@t2}$, ... and $T_{Mi+1@t1}$, $T_{Mi+1@t2}$, ... respectively to be applied at discrete successive times $t_1$, $t_2$, ..., and determining the temperature $T_m$ to be applied to the obtained quantity m of beans at each of said discrete successive times $t_1$, $t_2$, ... as follows:

$$T_{m@tz}=T_{Mi@tz}+[(T_{Mi+1@tz}-T_{Mi@tz})\cdot C\cdot(m-M_i)/(M_{i+1}-M_i)]$$

with C≤1.

This second embodiment provides a more accurate determination of the roasting recipe (R) to be applied on said quantity m of coffee beans compared to the first embodiment since a specific roasting profile is determined for each specific quantity.

In one mode of this second embodiment, C equals 1.

In one third embodiment, the control system is configured to determine the roasting recipe (R) to be applied on said quantity m of coffee beans introduced inside the vessel by:

identifying in said at least one series of roasting recipes the two accessible roasting recipes $R_i$ and $R_{i+1}$ adapted to the roasting of two successive pre-determined quantities $M_i$ and $M_{i+1}$ of beans wherein the quantity m is comprised between these two successive pre-determined quantities $M_i$ and $M_{i+1}$, from said two identified roasting recipes $R_i$ and $R_{i+1}$ respectively, providing the temperatures $T_{Mi@t1}$, $T_{Mi@t2}$, ... and $T_{Mi+1@t1}$, $T_{Mi+1@t2}$, ... respectively to be applied at discrete successive times $t_1$, $t_2$, ..., determining the temperature $T_m$ to be applied to the obtained quantity m of beans at each of said discrete successive times $t_1$, $t_2$, ... as follows:

if m is closer to $M_i$, then $T_{m@tz}=T_{Mi@tz}+[(T_{Mi+1@tz}-T_{Mi@tz})\cdot C\cdot(m-M_i)/(M_{i+1}-M_i)]$ if m is closer to $M_{i+1}$, then $T_{m@tz}=T_{Mi+1@tz}-[(T_{Mi+1@tz}-T_{Mi@tz})\cdot C\cdot(M_{i+1}-m)/(M_{i+1}-M_i)]$ with C≤1.

This third embodiment provides a more accurate determination of the roasting recipe (R) to be applied on said quantity m of coffee beans compared to the second embodiment.

In one preferred mode of this third embodiment, C equals 1.

Preferably, the control system is configured:

to obtain the type $N_y$ of coffee beans introduced inside the vessel, and based on the obtained type $N_y$, to get access to at least one series of roasting recipes ($R_{yi}$, $R_{yi+1}$, ...) adapted to the roasting of different successive pre-determined quantities ($M_i$, $M_{i+1}$, ...) of said beans of type Ny, and to said pre-determined quantities $M_i$, $M_{i+1}$, ..., and optionally to a coefficient Cy specific to said type Ny of coffee beans, and to determine the roasting recipe (R) to be applied on said quantity m of coffee beans of type $N_y$ introduced inside the vessel, based on said accessible series of roasting recipes ($Ry_i$, $Ry_{i+1}$, ...) adapted to the roasting of beans of type $N_y$ and on said pre-determined quantities ($M_i$, $M_{i+1}$, ...) and optionally based on said coefficient Cy.

The above embodiment enables control of the roasting apparatus to apply a roasting profile depending on the quantity and the type of coffee beans introduced inside the apparatus to guarantee that, whatever the quantity and the type, the beans are correctly roasted.

Usually, the type of the beans relates to at least one feature of the beans which has a direct impact on the process of roasting the beans.

The type of coffee beans can relate to specific features such as:

the origin of the beans (Arabica, Robusta, ... ) or a particular mixture or blend of beans of different origins. The mixture can be defined by the selection of specific beans and/or by the ratio of these different specific beans.

the level of pre-roasting of the beans. The coffee beans to be roasted can be green beans or can be partially pre-roasted beans that is beans having been obtained by heating green coffee beans and stopping said heating process before the end of the first crack. These partially pre-roasted beans can be pre-roasted at different levels with a direct impact on the subsequent final roasting operated in the roasting apparatus.

the moisture of the beans, the size of the beans.

The types of beans can refer explicitly to the nature of the beans like the origin, the level of pre-roasting, ... or can be a reference like an identification number, a SKU number or a trademark.

The type of beans $N_y$ can be obtained by different ways:

from the user. In that case, the user interface of the apparatus can display a list of types of beans and urge the user to select the types she/he is introducing inside the vessel.

Alternatively, this list can be displayed through the interface of a mobile device configured to communicate with the control system of the apparatus.

or from a code, such as a code provided on a beans package. In that case, the apparatus can comprise a code reader and the control system can be configured to urge the operator to scan the code of the beans (for example provided on the beans package) she/he is introducing inside the vessel.

In this embodiment where the type $N_y$ of coffee beans is obtained, the control system of the apparatus can get access to different series of roasting recipes. One series differs from another by the type of beans. In one series, all the roasting recipes relate to the roasting of the same types of beans.

In different series, the successive pre-determined quantities $M_i$, $M_{i+1}$, ... can be the same or not indifferently since the control system is configured to get access to these quantities anyway.

In addition, in this embodiment where the type $N_y$ of coffee beans is obtained, the control system of the apparatus can be figured to:

get access to a coefficient Cy specific to said type $N_y$ of coffee beans, and determine the roasting recipe (R) to be applied on said quantity m of coffee beans of type $N_y$ introduced inside the vessel by applying the above mentioned formulas determining the temperature $T_{m@t1}$, $T_{m@t2}$, ... to be applied to the obtained quantity m of beans at each of said discrete successive times $t_1$, $t_2$, with said specific coefficient Cy.

In another embodiment, the control system can be configured to:

obtain the further use $u_x$ of the roasted beans in a list of pre-determined uses (uα, uβ, ... ), and based on the obtained specific further use $u_x$, to get access at least to a series of roasting recipes ($R_{xi}$, $R_{xi+1}$, ...) adapted to the roasting of different successive pre-determined quantities ($M_i$, $M_{i+1}$, ...) of beans for said specific further use $u_x$ and optionally to a coefficient $C_x$ specific to said use $u_x$ of coffee beans, and determine the roasting recipe (R) to be applied on said obtained quantity m of coffee beans, based on said accessible series of roasting recipes ($R_{xi}$, $R_{xi+1}$, ...) adapted to the further use $u_x$ of the beans and optionally based on said coefficient $C_x$.

The further use of the roasted beans relates to the process of coffee extraction to be applied to the coffee beans once they have been roasted by the roasting apparatus. This further use desired by the user can be for example: preparation of an espresso, preparation of coffee by drip filtering, by French press, preparation of a cold brewed coffee. The fact of desiring to use one of these extracted coffees to prepare a white cup by mixing with milk, creamer, ... can be taken into account too.

The advantage is that the specific quantity m of coffee beans can be roasted to adapt the sensory profile of the resulting roasted coffee beans to this subsequent preparation.

In this embodiment where the further use $u_x$ of the roasted beans is obtained, the control system of the apparatus gets access to different series of roasting recipes. One series differs from another by the further use of the beans. In one series, all the roasting recipes relate to the roasting of the beans for the same further use, whereas two series differ by the intended further uses of beans roasted in each series.

In different series, the successive pre-determined quantities $M_i$, $M_{i+1}$, ... can be the same or not indifferently since the control system is configured to get access to these quantities anyway.

In addition, in this embodiment where the further use $u_x$ of coffee beans is obtained, the control system of the apparatus can be figured to:

get access to a coefficient $C_x$ specific to said further use of coffee beans, and determine the roasting recipe (R) to be applied on said quantity m of coffee beans introduced inside the vessel by applying the above mentioned formulas determining the temperature $T_{m@t1}$, $T_{m@t2}$, ... to be applied to the obtained quantity m of beans at each of said discrete successive times $t_1$, $t_2$, with said specific coefficient Cx.

Similarly to above, the control system can be configured to:

obtain the type $N_y$ of coffee beans introduced inside the vessel and the further use $u_x$, and based on the obtained type $N_y$ and further use $u_x$, to get access to at least one series of roasting recipes (Ryxi, Ryxi+1, ...) adapted to the roasting of different successive pre-determined quantities (Mi, $M_{i+1}$, ...) of beans for the specific further use ux of said roasted beans of type Ny, and to determine the roasting recipe (R) to be applied on said obtained quantity m of coffee beans, based on said accessible series of roasting recipes ($R_{xyi}$, $R_{xyi+1}$, ...) adapted to said further use $u_x$ of said beans $N_y$.

According to one embodiment, the quantity m of coffee beans introduced in the vessel can be supplied by the user. The user can supply this quantity through a user interface of the apparatus or alternatively through the interface of mobile device configured to communicate with the control system of the apparatus.

According to one mode, the quantity m of coffee beans introduced in the vessel can be obtained from the user. In that case, the apparatus can comprise a user interface to enable the user to enter the quantity of beans she/he is introducing inside the vessel. Alternatively, this quantity can be entered through the interface of a mobile device configured to communicate with the control system of the apparatus meaning the control system can comprise a communication interface to communicate with the external mobile device.

In one embodiment, the vessel of the apparatus can be transparent and the wall of the vessel can present level indicators readable by the operator.

Consequently, when the operator introduces the beans in the transparent vessel, he/she is able to read the introduced quantity looking at the level indicator. This information can then be entered as an input inside the control system of the apparatus, for example through a user interface.

In another mode, the quantity m of coffee beans introduced in the vessel can be obtained—from a measuring device configured to measure the quantity m of beans and connected to the control system of the apparatus. In that case, the measure of the quantity of the beans can be automatically provided to the control system of the apparatus.

According to one embodiment, the apparatus can comprise said measuring device configured to measure the quantity m of beans introduced in the vessel and, in the step of supplying the controller with the quantity m of coffee beans, said quantity of coffee beans can be automatically measured by the measuring device and supplied to the control system of the apparatus.

The measuring device can be
a scale measuring weight of coffee beans, or
a device comprising at least one cavity of predetermined volume, or
a level sensor measuring a volume of coffee beans inside the vessel.

Preferably, this quantity is the weight and the measuring apparatus is a weight scale.

The device comprising at least one cavity of predetermined volume enables the user to select a cavity of predetermined volume and to fill this cavity completely with beans with the result that a defined volume of beans is measured. The control system of the roasting apparatus is provided with this precise volume of beans. In one specific embodiment, the roasting apparatus can comprise a set of different vessels to contain different volumes of coffee beans, such as small, medium and large volume vessels. In that embodiment the control system can be configured to obtain the quantity of coffee beans inside the vessel by recognising which vessel (small, medium, large) is positioned inside the roasting apparatus.

The measuring device can be a level sensor measuring a volume of coffee beans inside the vessel. The vessel can be removed from the roasting apparatus during the filling operation and once the vessel is positioned back inside the roasting apparatus, the level sensor can measure the level of beans. The process control is configured to deduce the volume of beans from said measured level.

If it is the volume of beans that is measured then, based on an identification of the type of the beans, their density can be obtained, and accordingly their precise weight can be deduced.

According to another embodiment, the apparatus can comprise:
- a set of different vessels, each vessel being configured to hold a specific quantity of coffee beans, and
- a vessel recognition device, and
- in the step of obtaining the quantity m of beans introduced in the vessel, said quantity of coffee beans is automatically supplied by recognising the vessel.

According to another embodiment, the apparatus can comprise:
- a container to store coffee beans,
- a dosing device to dose and supply coffee beans to the vessel, and, in the step of obtaining the quantity m of identified beans introduced in the vessel, the quantity of dosed coffee beans can be automatically supplied to the control system.

In a particular embodiment, the apparatus can comprise an identification device configured to read identification means from a beans package, said identification means providing directly or indirectly the quantity m of beans inside the package.

In one mode, this beans package can be configured to supply the vessel of the apparatus with its whole content and accordingly the quantity of beans introduced in the vessel is automatically obtained.

In another mode, a part of the beans of the package can be introduced in the vessel and measured according to one of the above embodiment. Then the amount of beans remaining in the package can be automatically determined.

In a second aspect, there is provided a system for roasting coffee beans comprising:
- a roasting apparatus such as described above, and
- an apparatus for measuring a quantity of coffee beans introduced inside the vessel, and wherein the control system of the roasting apparatus is operable to obtain:
- the quantity m of coffee beans introduced inside the vessel and measured by the measuring apparatus.

Communication means can enable communication between the roasting apparatus and the measuring apparatus through Wi-Fi, Bluetooth, a cable (USB, Serial), optical communication, GSM communication.

In a third aspect, there is provided a method of roasting coffee beans using the apparatus such as described above and applying a roasting recipe providing the temperature $T_{@t1}$, $T_{@t2}$, . . . to be applied at discrete successive times $t_1$, $t_2$, . . . , respectively, the method comprising:
- obtaining the quantity m of coffee beans introduced inside the vessel
- getting access to at least one series of roasting recipes ($R_i$, $R_{i+1}$, . . . ), said recipes being adapted to the roasting of different successive pre-determined quantities ($M_i$, $M_{i+1}$, . . . ) of beans of same type and to said pre-determined quantities $M_i$, $M_{i+1}$, . . . , and
- based on said accessible series of roasting recipes ($R_i$, $R_{i+1}$, . . . ) adapted to the roasting of different successive pre-determined quantities ($M_i$, $M_{i+1}$, . . . ) of beans of same type and based on said obtained quantity m of coffee beans introduced inside the vessel, determining the roasting recipe (R) to be applied on said obtained quantity m of coffee beans introduced inside the vessel.

Preferably, this method comprises:
- obtaining the type $N_y$ of coffee beans introduced inside the vessel, and
- getting access to at least one series of roasting recipes ($R_{yi}$, $R_{yi+1}$, . . . ) adapted to the roasting of different successive pre-determined quantities ($M_i$, $M_{i+1}$, . . . ) of beans of type $N_y$, and
- determining the roasting recipe (R) to be applied on said quantity m of coffee beans of type $N_y$ based on said accessible series of roasting recipes ($R_{yi}$, $R_{yi+1}$, . . . ) adapted to the beans of type $N_y$.

In one embodiment, this method comprises:
- obtaining the further use $u_x$ of the roasted beans introduced inside the vessel in a list of pre-determined uses ($u\alpha$, $u\beta$, . . . ), and
- getting access to at least one series of roasting recipes ($R_{xi}$, $R_{xi+1}$, . . . ) adapted to the roasting of different successive pre-determined quantities ($M_i$, $M_{i+1}$, . . . ) for said further use $u_x$, and
- determining the roasting recipe (R) to be applied on said obtained quantity m of coffee beans based on said accessible series of roasting recipes ($R_{xi}$, $R_{xi+1}$, . . . ) adapted to the further use $u_x$.

In a fourth aspect, there is provided a computer program of a processing unit of control system of an apparatus for roasting coffee beans such as described above, the computer program comprising program code and/or program logic which when executed on the processing unit effects the steps of:
- obtaining the quantity m of coffee beans introduced inside the vessel
- getting access to at least one series of roasting recipes ($R_i$, $R_{i+1}$, . . . ), said recipes being adapted to the roasting of different successive pre-determined quantities ($M_i$, $M_{i+1}$, . . . ) of beans of same type and to said pre-determined quantities $M_i$, $M_{i+1}$, . . . , and
- based on said accessible series of roasting recipes ($R_i$, $R_{i+1}$, . . . ) adapted to the roasting of different successive pre-determined quantities ($M_i$, $M_{i+1}$, . . . ) of beans of same type and based on said obtained quantity m of coffee beans introduced inside the vessel, determining the roasting recipe (R) to be applied on said obtained quantity m of coffee beans introduced inside the vessel.

Preferably, this program code and/or program logic effects the steps of:
- obtaining the type $N_y$ of coffee beans introduced inside the vessel and
- getting access to at least one series of roasting recipes ($R_{yi}$, $R_{yi+1}$, . . . ) adapted to the roasting of different successive pre-determined quantities ($M_i$, $M_{i+1}$, . . . ) of beans of type $N_y$, and
- determining the roasting recipe (R) to be applied on said quantity m of coffee beans of type $N_y$ based on said accessible series of roasting recipes ($R_{yi}$, $R_{yi+1}$, . . . ) adapted to the beans of type $N_y$.

In one embodiment, this program code and/or program logic effects the steps of:
- obtaining the further use $u_x$ of the roasted beans introduced inside the vessel in a list of pre-determined uses ($u\alpha$, $u\beta$, . . . ), and
- getting access to at least one series of roasting recipes ($R_{xi}$, $R_{xi+1}$, . . . ) adapted to the roasting of different successive pre-determined quantities ($M_i$, $M_{i+1}$, . . . ) for said further use $u_x$, and
- determining the roasting recipe (R) to be applied on said obtained quantity m of coffee beans based on said accessible series of roasting recipes ($R_{xi}$, $R_{xi+1}$, . . . ) adapted to the further use $u_x$.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Roasting Apparatus

Figure 1:
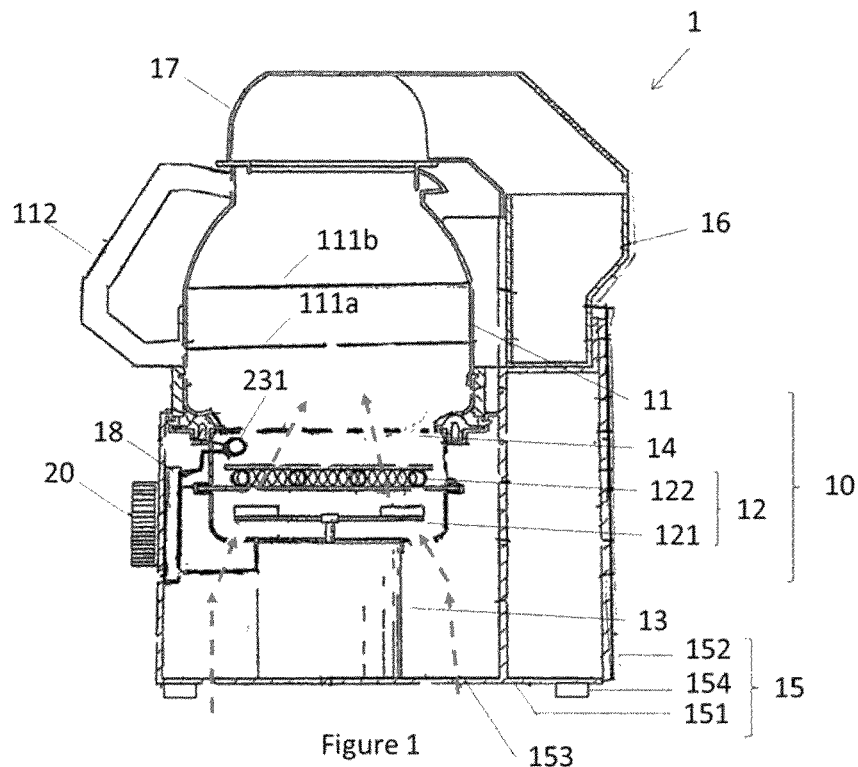
FIG. 1 is a schematic drawing of a general roasting apparatus enabling the implementation of the method of the present invention.

FIG. 1 shows an illustrative view part of a roasting apparatus 1. Functionally, the roasting apparatus 1 is operable to roast coffee beans hold in a vessel 11 by means of a flow of hot air introduced inside this vessel. At a first level, the apparatus comprises: a housing 15, a roasting unit 10 and a control system 180. These components will now be sequentially described.

Housing of Roasting Apparatus

The housing 15 houses and supports the aforementioned components and comprises a base 151 and a body 152. The base 151 being for abutment with a support surface, preferably through feet 154 that provide a gap between the base and the support surface. The body 152 is for mounting thereto the components.

Roasting Unit of Roasting Apparatus

The roasting unit 10 is operable to receive and roast coffee beans.

The roasting unit 10 typically comprises at a second level of the roasting apparatus 1: a vessel 11 and a heating device 12, which are sequentially described.

The vessel 11 is configured to receive and hold the coffee beans introduced by the operator. A removable cover 17 enables the introduction and removal of beans. The bottom of the vessel is configured to enable air to pass through, specifically it can be a perforated plate 14 on which the beans can lie and through which air can flow upwardly.

A chaff collector 16 is in flow communication with the vessel 1 to receive chaffs that progressively separate from the beans and due to their light density are blown off to the chaff collector.

The vessel 11 comprises a handle 112 in order to enable the user to remove the vessel from the housing 15 and get the roasted beans.

In the illustrated embodiment the vessel 1 is at least partially transparent and comprises an upper level line 111b and a lower level line 111a designed on the vessel. Once the beans have been introduced inside the vessel 1, the user is able to check the quantity of beans introduced by reference to these levels 111a, 111b. In particular, the operator is able to check if the quantity is inferior to the lower level, between the lower and upper levels or above the upper level.

Figure 7A:
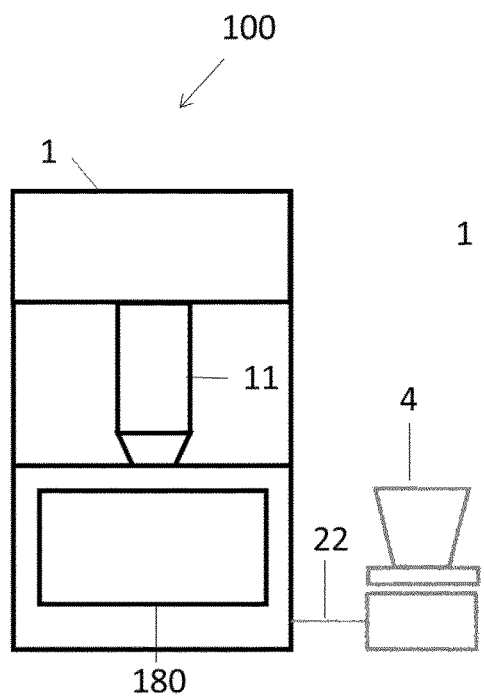
Figure 7B:
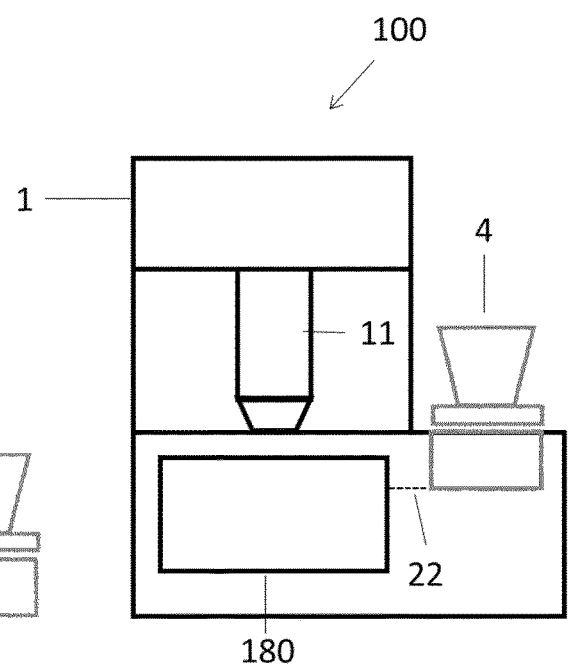
Figure 7C:
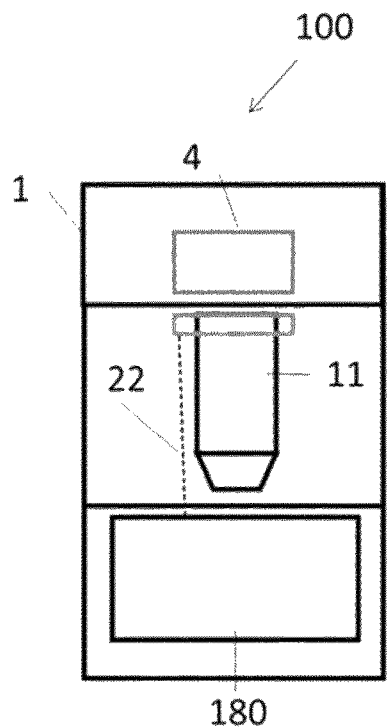
Figure 7D:
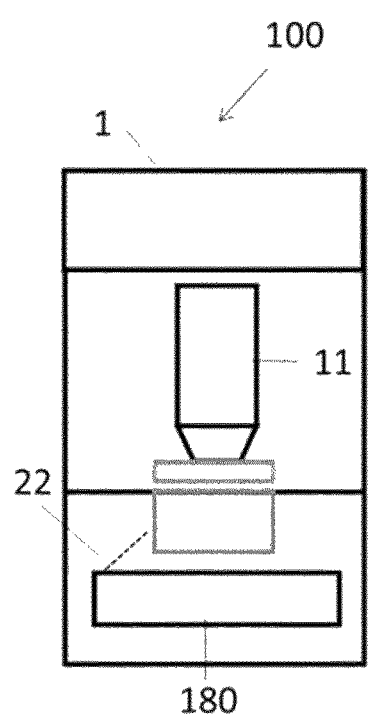

In an alternative embodiment of the roaster, illustrated in FIGS. 7b to 7d, the roasting unit can comprise a device to automatically detect the quantity of beans introduced inside the vessel 1, like a weight scale or a level sensor (capacitive or optical) inside the vessel.

In another embodiment of the roaster, not represented, the roasting unit can comprise a set of different vessels, each vessel being configured to hold a specific quantity of coffee beans. The roasting unit can comprise a vessel recognition device.

The heating device 12 comprises an air flow driver 121 and a heater 122.

The air flow driver 121 is operable to generate a flow of air in direction of the bottom of the vessel. The generated flow is configured to heat the beans and to agitate and lift the beans. As a result the beans are homogenously heated. Specifically, the air flow driver can be a fan powered by a motor 13. Air inlets 153 can be provided inside the base 151 of the housing in order to feed air inside the housing, the air flow driver blowing this air in direction of the vessel 11 as illustrated by doted lines arrows.

The heater 122 is operable to heat the flow of air generated by the air flow driver 121. In the specific illustrated embodiment, the heater is an electrical resistance being positioned between the fan and the perforated plate 14 with the result that the flow of air is heated before it enters the vessel 11 to heat and to lift the beans.

The heater 122 and/or the air flow driver 121 is/are operable to apply a roasting profile to the beans, this roasting profile being defined as a curve of temperature against time.

Although the invention is described with a roaster implementing a fluidized bed of hot air, the invention not limited to this specific type of roasting apparatus. Drum roasters and other kinds of roasters can be used.

The roasting apparatus 10 usually comprises a user interface 20 enabling the display and the input of information.

The roasting apparatus can comprise a code reader to read a code associated to a type of coffee beans, for example present on the package of coffee beans. Preferably, this code reader is positioned in the apparatus so that the operator is able to easily position a code in front of it. It is preferably positioned at the front face of the apparatus, for example close to a user interface 20 of the apparatus. Accordingly, information provided by the code can be immediately displayed through the display of the user interface 20 positioned aside.

Control System of Roasting Apparatus

Figure 2:
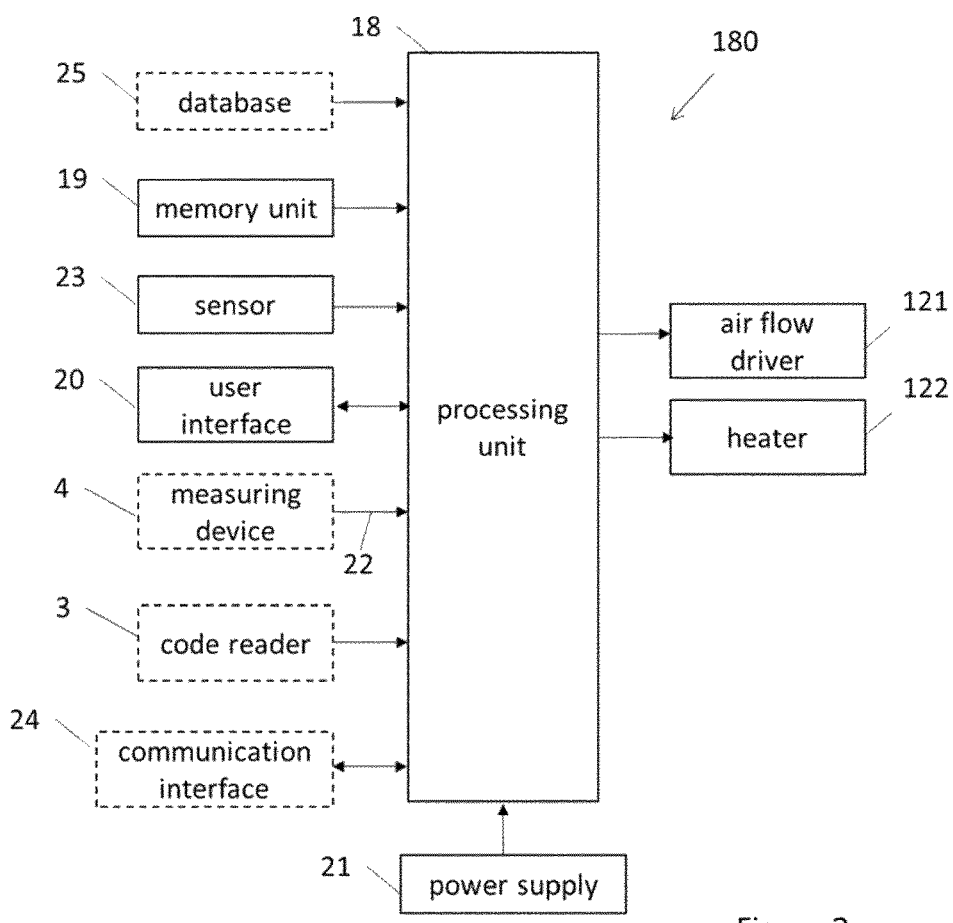
FIG. 2 shows a block diagram of a control system of the general apparatus according to FIG. 1.

With reference to FIGS. 1 and 2, the control system 180 will now be considered: the control system 180 is operable to control the components of the roasting unit to roast coffee beans. The control system 180 typically comprises at a second level of roasting apparatus: a user interface 20, a processing unit 18, sensors 23, a power supply 21, a memory 19, optionally a communication interface 24 for remote connection, optionally a code reader 3, optionally a measuring device 4, optionally a database 25.

The user interface 20 comprises hardware to enable a user to interface with the processing unit 1, by means of user interface signal. More particularly, the user interface receives commands from a user, the user interface signal transfers the said commands to the processing unit 18 as an input. The commands may, for example, be an instruction to execute a roasting process and/or to adjust an operational parameter of the roasting apparatus 1 and/or to power on or off the roasting apparatus 1. The processing unit 18 may also output feedback to the user interface 20 as part of the roasting process, e.g. to indicate the roasting process has been initiated or that a parameter associated with the process has been selected or to indicate the evolution of a parameter during the process or to create an alarm.

In a particular embodiment, the user interface can be used:
- to provide the quantity m of the coffee beans introduced inside the vessel by manual input.
- to provide identification $N_y$ of the coffee beans introduced inside the vessel by manual input such as selection of an identification type in a list of pre-selected coffee beans or by entering a digital reference of the coffee, for example read from a coffee beans package.
- to provide the further use $u_x$ of the beans introduced in and to be roasted inside the vessel by manual input such as selection of the use in a list of pre-determined uses (uα, uβ, . . . ).

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 24 as described below. In that case the input and output can be transmitted to the mobile device through the communication interface 24.

The sensors 23 are operable to provide an input signal to the processing unit 18 for monitoring of the roasting process and/or a status of the roasting apparatus. The input signal can be an analogue or digital signal. The sensors 23 typically comprise at least one temperature sensor 231 and optionally one or more of the following sensors: level sensor associated with the vessel 1, air flow rate sensor, position sensor associated with the vessel and/or the chaff collector.

If the apparatus or the system comprises a measuring device 24, this device is operable to provide the input 22 that is the quantity of coffee beans introduced inside the vessel 11. This input 22 can be the weight of the beans measured by a scale or a volume of beans or a level measured by a level sensor associated with the vessel 11.

A code reader 3 can be provided and operable to read a code on coffee beans package and automatically provide an input that is the identification of the coffee beans introduced in the measuring device 4 or in the vessel 11.

The processing unit 18 generally comprise memory, input and output system components arranged as an integrated circuit, typically as a microprocessor or a microcontroller. The processing unit 18 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 18 may also comprise one or more of the aforementioned integrated circuits. An example of the later is several integrated circuits is arranged in communication with each other in a modular fashion e.g.: a slave integrated circuit to control the user interface 20 in communication with a master integrated circuit to control the roasting unit 10.

The power supply 21 is operable to supply electrical energy to the said controlled components and the processing unit 18. The power supply 21 may comprise various means, such as a battery or a unit to receive and condition a main electrical supply. The power supply 21 may be operatively linked to part of the user interface 20 for powering on or off the roasting apparatus The processing unit 18 generally comprises a memory unit 19 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 19 can be idealised as comprising a coffee beans roasting program.

The control system 180 is operable to apply this coffee beans roasting program by controlling the heating device 12—that is, in the particular illustrated embodiment of FIG. 1, the air flow driver 121 and/or the heater 122—usually using signal of the temperature probe 231.

The coffee beans roasting program can effect control of the said components using extraction information encoded on a code and/or other information that may be stored as data on the memory unit 19 or from a remote source through the communication interface and/or input via the user interface 20 and/or signal of the sensors 23.

In particular, the control system is configured to apply a roasting recipe (R) providing the temperature $T_{@t1}$, $T_{@t2}$, . . . $T_{@tfinal}$ to be applied at discrete successive times $t_1, t_2, \ldots, t_{final}$ respectively.

With that aim, the processing unit 18 is operable to:
- receive an input of the temperature sensor 231,
- process the input according to roasting recipe R,
- provide an output, which is the roasting recipe R. More specifically the output comprises the operation of at least the heater 122 and the air flow driver 121.

The temperature measured by the temperature sensor 231 is used to adapt the power of the heater 122 and/or the power of the motor 13 of the air driver 121 in a feedback loop in order to apply the roasting recipe R to the beans.

Depending on the type of control applied in the roaster, the heater 122 can be powered at one pre-determined power, meaning its temperature is constant, and in that case the power of the motor 13 of the air driver 121 can be controlled based on the temperature monitored at the sensor 231 in order to vary the time of contact of the flow air through the heater during its movement.

Alternatively, the motor 13 of the air driver 121 can be powered at one pre-determined power, meaning the flow rate of air is constant, and in that case the power of the heater 122 can be controlled based on the temperature monitored at the sensor 231 in order to heat more or less air during its passage through the heating device.

In a last alternative, both heater 122 and motor 13 can be controlled based on the monitoring of the temperature by sensor 231.

The processing unit can comprise a communication interface 24 for data communication of the roasting apparatus 1 with another device and/or system, such as a server system, a mobile device and/or a physically separated measuring apparatus 2. The communication interface 24 can be used to supply and/or receive information related to the coffee beans roasting process, such as roasting process information, type of the beans, quantity of beans. The communication interface 24 may comprise a first and second communication interface for data communication with several devices at once or communication via different media.

The communication interface 24 can be configured for cabled media or wireless media or a combination thereof, e.g.: a wired connection, such as RS-232, USB, I2C, Ethernet define by IEEE 802.3, a wireless connection, such as wireless LAN (e.g. IEEE 802.11) or near field communication (NFC) or a cellular system such as GPRS or GSM. The communication interface 24 interfaces with the processing unit 18, by means of a communication interface signal. Generally the communication interface comprises a separate processing unit (examples of which are provided above) to control communication hardware (e.g. an antenna) to interface with the master processing unit 18. However, less complex configurations can be used e.g. a simple wired connection for serial communication directly with the processing unit 18.

The processing unit 18 enables access to different roasting recipes ($R_1$, $R_2$, . . . ) adapted to the roasting of different successive pre-determined quantities ($M_1$, $M_2$, . . . ) of beans and to said pre-determined quantities ($M_1$, $M_2$, . . . ).

The recipes and the pre-determined quantities can be stored in a memory 19 of the processing unit 18. Alternatively, these data can be stored in a remote server and the processing unit 18 can be supplied with access to this remote server through the communication interface 24, directly or indirectly through a mobile device establishing connection between the remote server and the processing unit.

These recipes and quantities can be part of a database 25 stored in the memory unit 19 or remotely as mentioned above.

In one alternative embodiment, the control system can be provided with the roasting recipes and their associated pre-determined quantities M, during a code reading operation, these pieces of information being encoded inside the code and decoded by the control system.

Figure 3:
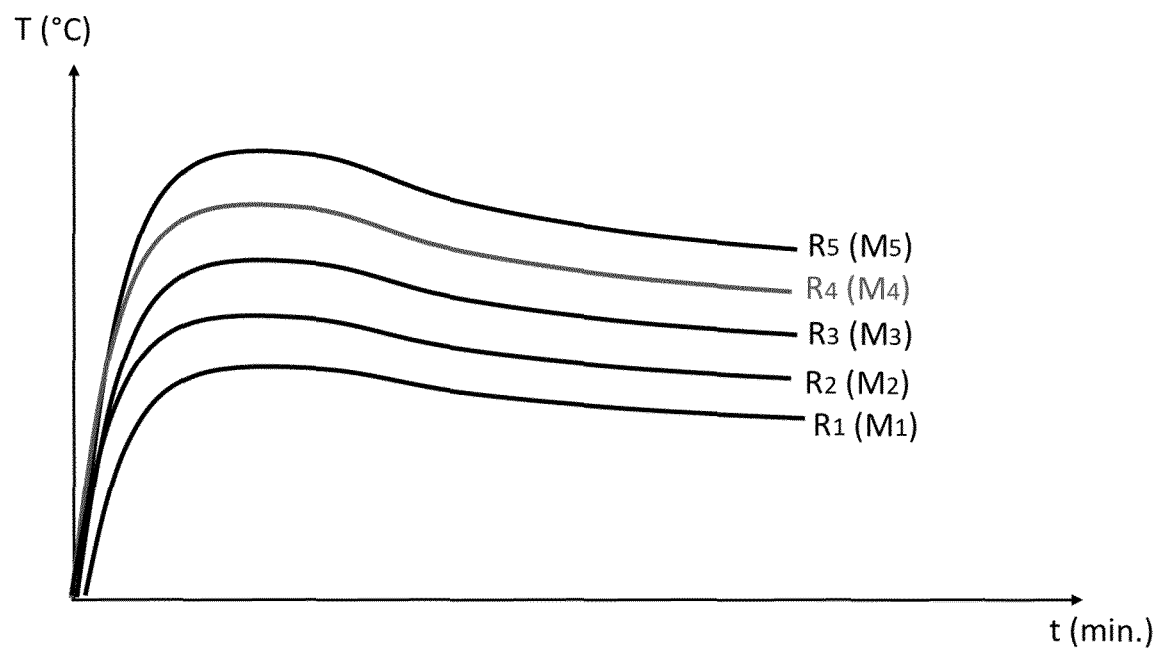
FIG. 3 represents schematically series of roasting recipes ($R_1$, $R_2$, ...) adapted to the roasting of different successive pre-determined quantities ($M_1$, $M_2$, ...) of beans of same nature.

FIG. 3 schematically illustrates the type of roasting recipes accessible to the processing unit. Each of the illustrated roasting recipes $R_1$, $R_2$, . . . $R_5$ provides the temperature profile to be applied to a corresponding dedicated quantity of beans $M_1$, $M_2$, . . . $M_5$ respectively in function of time. For example, the different pre-determined quantity of beans $M_1$, $M_2$, . . . $M_5$ can be discrete weights, such as: 50 g, 100 g, 150 g, 200 g and 250 g, of the same type of beans or of the same blend of beans.

These temperature profiles are usually defined by experimentation by defining the optimal profile for a pre-determined quantity of beans.

Usually, one series of roasting recipes $R_1$, $R_2$, . . . $R_5$ is adapted for a specific type of coffee beans. The type of coffee beans can relate to specific features such as:
- the origin of the beans (Arabica, Robusta, . . . ) or a particular mixture of beans of different origins. The mixture can be defined as the blend of beans of different specific origins and by the ratio of these beans of different specific origins,
- the level of pre-roasting of the beans. The coffee beans to be roasted can be green beans or can be partially pre-roasted beans that is beans having been obtained by heating green coffee beans and stopping said heating process before the end of the first crack. These partially pre-roasted beans can be pre-roasted at different levels with a direct impact on the subsequent roasting.
- the moisture of the beans,
- the size of the beans.

Figure 5:
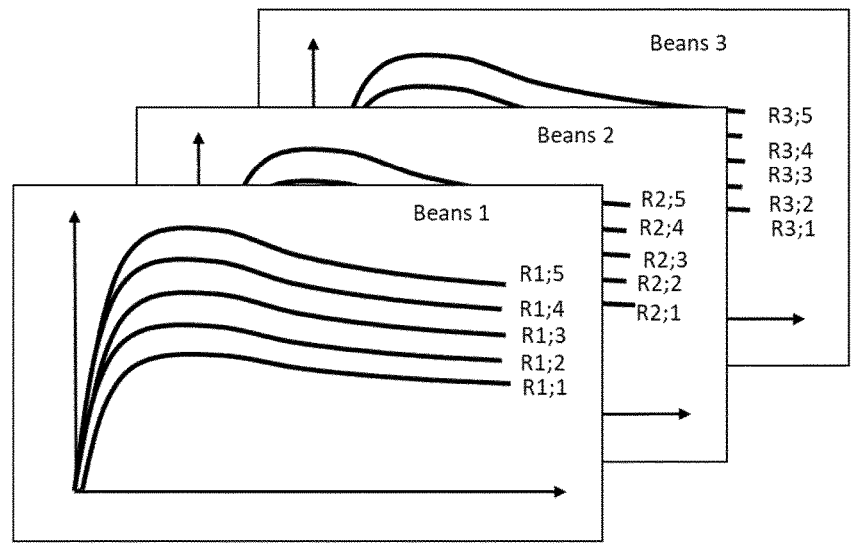
FIGS. 5 and 6 represent schematically series of roasting recipes ($R_1$, $R_2$, ...), FIGS. 7a to 7d schematically illustrate different embodiments of the system according to the present invention.

FIG. 5 illustrates three different series of roasting recipes ($R_{1;1}$, $R_{1;2}$ . . . $R_{1;5}$), ($R_{2;1}$, $R_{2;2}$, . . . $R_{2;5}$) and ($R_{3;1}$, $R_{3;2}$, . . . $R_{3;5}$) adapted to three different types of beans (Beans 1, Beans 2, Beans 3) and to pre-determined quantities ($M_1$, $M_2$, . . . $M_5$) similarly to FIG. 3.

In a particular embodiment, one series of roasting recipes $R_1$, $R_2$, . . . $R_5$ can be adapted for a specific further use of the roasted beans. Depending on the desired use of the final roasted beans that is the way to extract a coffee beverage from the roasted beans the sensory profile of the roasted coffee beans can be adapted to this subsequent preparation.

Figure 6:
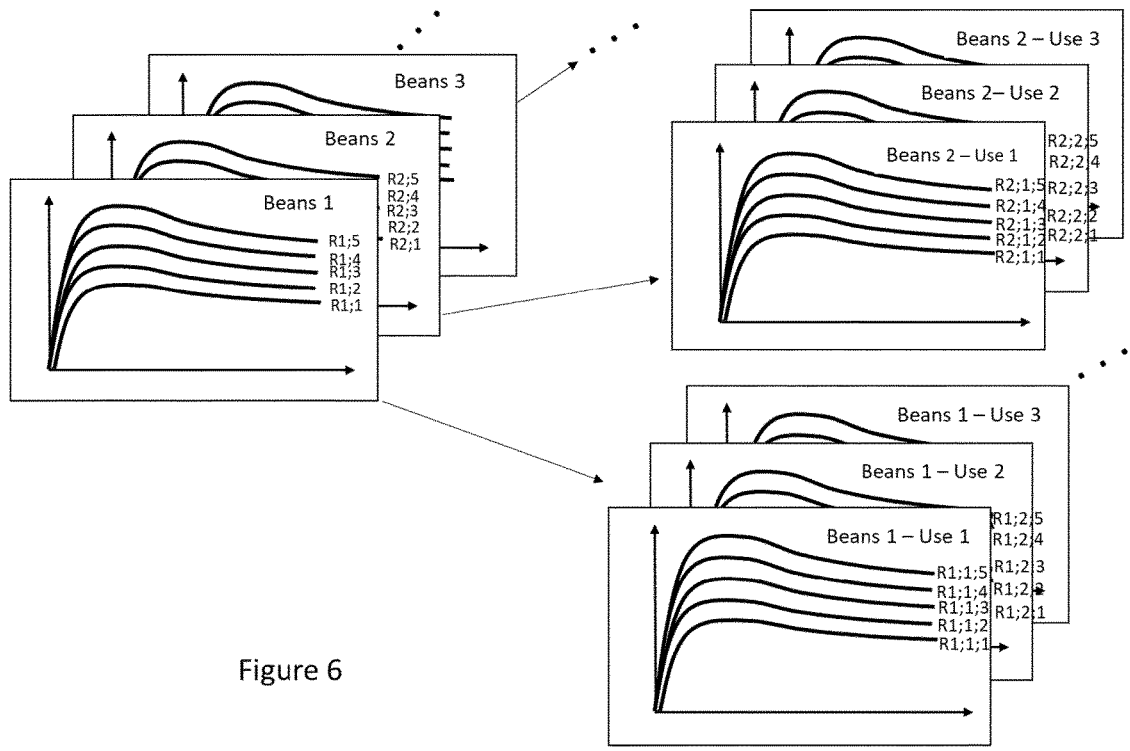

This further use can be:
- preparation of an espresso coffee with pressurised hot water,
- preparation of coffee with a French press,
- preparation of coffee with a drip filter,
- preparation of coffee by cold brew method,
- preparation of a coffee whatever the extraction with the final aim to prepare a white cup that is mixing extracted coffee with a white component such as milk, creamer, . . . , FIG. 6 illustrates series of roasting recipes $R_1$, $R_2$, . . . $R_5$ adapted to different pre-determined quantities ($M_1$, $M_2$, . . . $M_5$) of different types of beans (Beans 1, Beans 2, Beans 3, . . . ) and to different further uses of said beans (Beans 1—Use 1, Beans 1—Use 2, Beans 1—Use 3, . . . and Beans 2—Use 1, Beans 2—Use 2, Beans 2—Use 3, . . . and Beans 3—Use 1, . . . ).

These temperature profiles are usually defined by experimentation by defining the optimal profile for the pre-determined quantity $M_i$ of the specific type $N_y$ of beans and for each specific further use $u_x$.

When a customised quantity m of coffee beans is introduced inside the vessel 11 in order to be roasted, the processing unit 18 of the apparatus of the present invention is configured to implement several steps.

First, the processing unit 18 of the apparatus of the present invention is configured to obtain for beans introduced inside the vessel the quantity m of said type of coffee beans.

Optionally and preferably, the processing unit is configured to obtain the type $N_y$ of said coffee beans.

Optionally, the processing unit is configured to obtain the future use ux of the coffee beans.

As mentioned earlier, these pieces of information about identification, quantity and use can be provided through the user interface 20 of the roasting apparatus, the display of the user interface guiding the user to enter information for each types of coffee.

Alternatively, for the identification of the coffee type, information can be obtained by means of a code reader 3, the user being able or incited to scan the code of the different beans in front of the code reader.

Figure 8:
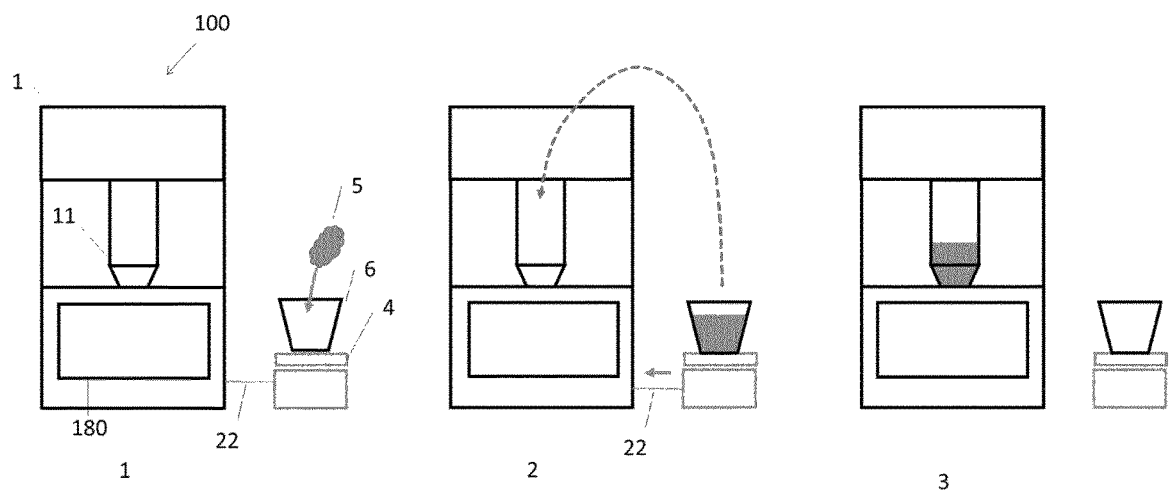
FIGS. 8 and 9 represent schematically methods to use systems according to the present invention.
Figure 9:
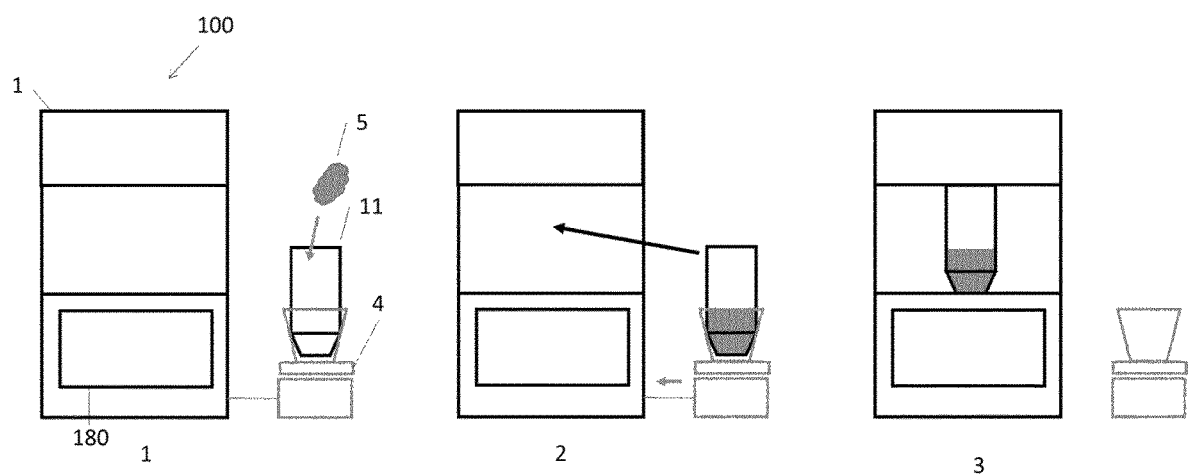

Alternatively, for the quantity of beans, the quantity can be measured and automatically communicated to the control system 180, for example by the use of a measuring device 4 directly connected to the apparatus or indirectly through the communication interface, as illustrated in FIG. 8 or 9.

Then, in a further step, the control system of the roasting apparatus is configured to get access to information related to the roasting of coffee beans and in particular to at least one series of roasting recipes ($R_i$, $R_{i+1}$, . . . ) adapted to the roasting of different successive pre-determined quantities ($M_i$, $M_{i+1}$, . . . ) of beans of same type and to said pre-determined quantities $M_i$, $M_{i+1}$, . . ., the roasting recipes $R_i$, providing the temperatures $T_{Mi@t_z}$ to be applied to this quantity of beans at discrete successive times $t_z$ respectively. For example, based on FIG. 3, the control system is configured to get access to the series of the roasting recipes R1, R2, R3, R4, R5 adapted to the roasting of pre-determined quantities M1, M2, M3, M4, M5 respectively of the same type. The pre-determined quantities represent successive values of quantity.

In a further step, the control system is configured to determine the roasting recipe (R) to be applied on said obtained customised quantity m of coffee beans introduced inside the vessel.

In one simplest first embodiment, the processing unit 18 is operable to select one recipe in the accessible series of roasting recipes R1, R2, R3, R4, R5. The selection consists in identifying the roasting recipe $R_i$, adapted to the roasting of a pre-determined quantity of beans $M_i$, said pre-determined quantity of beans $M_i$ presenting the smallest difference of quantity with the obtained quantity m.

For illustration, based on the series of recipes R1, . . . R5 of FIG. 3 to be applied to different pre-determined weights M1, . . . M5 of beans such as: 50 g, 100 g, 150 g, 200 g and 250 g, if the input for the quantity m of beans is 210 g, then the processing unit 18 is operable to select the roasting recipe R4 corresponding to the pre-determined quantity M4 of beans 200 g because the smallest difference between 210 and the five pre-determined quantities 50 g, 100 g, 150 g, 200 g, 250 g is the difference between 210 g and 200 g.

Figure 4:
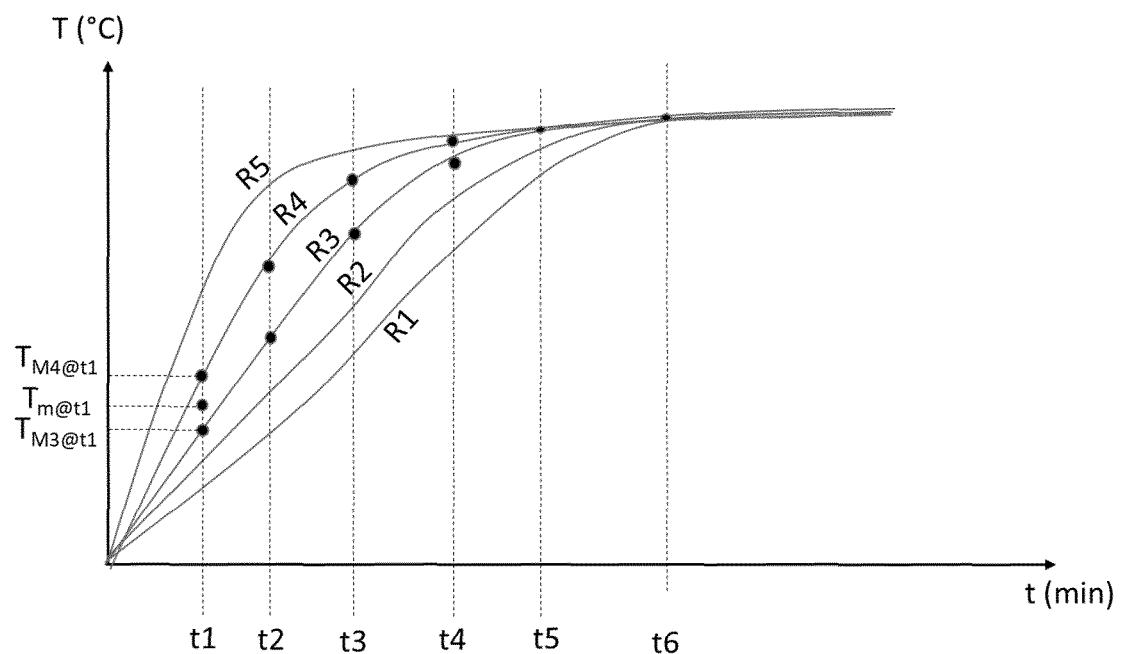
FIG. 4 represents the determination of the roasting recipe R for a customised quantity m of beans from a series of recipes.

In the second embodiment, the processing unit 18 is operable to calculate a specific roasting recipe (R) to be applied on said specific quantity m of coffee beans introduced inside the vessel from the accessible series of recipes (R1, R2, R3, R4, R5) as illustrated in FIG. 4 and explained below.

FIG. 4 schematically illustrates a series of roasting recipes R1, R2, . . . R5 providing the temperature profile to be applied to a corresponding dedicated quantity of beans M1, M2, . . . M5 respectively, for example 50 g, 100 g, 150 g, 200 g and 250 g, in function of time for one type of beans, for example pure Arabica beans.

In a first step of determination of the roasting recipe (R), the processing unit identifies, in the series, the two roasting recipes $R_i$ and $R_{i+1}$ adapted to the roasting of two successive pre-determined quantities $M_i$ and $M_{i+1}$ of beans wherein the quantity m is comprised between these two successive pre-determined quantities $M_i$ and $M_{i+1}$. For example, if the obtained quantity m is 160 g, then roasting recipes R3 and R4 corresponding respectively to 150 g and 200 g of coffee beans are identified.

In a second step, at discrete successive times $t_1, t_2, \ldots, t_6$, the temperature $T_m$ to be applied to the obtained quantity m of beans at each of said discrete successive times $t_1, t_2, \ldots t_6$ is calculated from the roasting recipes R3 and R4 as follows:

$$T_{m@tz} = T_{Mi@tz} + [(T_{Mi+1@tz} - T_{Mi@tz}) \cdot C \cdot (m - M_i)/(M_{i+1} - M_i)]$$

with C≤1.

In particular, at time $t_1$, the temperature $T_{m@t1}$ to be applied is:

$$T_{M3@t1} + [(T_{M4@t1} - T_{M3@t1}) \cdot C \cdot (m - M_3)/(M_4 - M_3)]$$

meaning, for example, for the exemplifying above weights:

$$T_{M3@t1} + [(T_{M4@t1} - T_{M3@t1}) \cdot C \cdot (160 - 150)/50]$$

The calculation is reproduced at each time $t_2$ to $t_6$ determining the full roasting recipe R for the quantity m of beans.

These discrete successive times can be pre-defined to provide a final roasting recipe with enough points to be implemented by the roasting apparatus. For example, successive times may differ by about 20 to 40 seconds.

In the above formula, the coefficient C is usually fixed experimentally and can vary depending on the roaster specifications (power, vessel size, type of heater, . . . ), the type of the beans and/or the future use of the roasted beans.

In one embodiment, the coefficient C can be set according to the roaster specifications only.

In another embodiment, the coefficient C can be set according to the type of beans. In that case, coefficient C can be set:

generally at a high level of definition of the beans such as the origin of the beans, e.g. Arabica or Robusta providing a coefficient $C_A$ when Arabica beans are roasted and a coefficient $C_R$ when Robusta beans are roasted, or more precisely for each type of beans $N_y$ by reference to coefficient $C_y$ adapted to specific type of beans $N_y$ with more precise criteria than the two general origins.

In these cases, the control system is configured to obtain the type of beans (Arabica, Robusta or Ni) introduced in the vessel and then to get access to the coefficient $C_A$, $C_R$ or Ci corresponding to that type of beans.

Preferably, the coefficient C is set according to the roaster specifications and the type of beans.

In a particular embodiment, the coefficient C can be set according to the further use of the beans. In that embodiment, the coefficient C is preferably set according to the roaster specifications too and in addition, even more preferably, according to the type of beans.

In absence of information about the roaster or the type of beans or the further use, by default, the coefficient C equals 1.

In a third embodiment, the processing unit 18 is operable to calculate a specific roasting recipe (R) to be applied on said specific quantity m of coffee beans introduced inside the vessel from the accessible series of recipes (R1, R2, R3, R4, R5) in a similar way as in the second embodiment, except that in the second step of determination of the roasting recipe (R), the temperature $T_m$ to be applied to the obtained quantity m of beans at each of said discrete successive times $t_1, t_2, \ldots t_6$ is calculated from the roasting recipes R3 and R4 as follows:

if m is closer to $M_3$, then $T_{m@ti} = T_{M3@ti} + [(T_{M4@ti} - T_{M3@ti}) \cdot C \cdot (m - M_3)/(M_4 - M_3)]$ if m is closer to $M_4$, then $T_{m@ti} = T_{M4@ti} - [(T_{M4@ti} - T_{M3@ti}) \cdot C \cdot (M_4 - m)/(M_4 - M_3)]$ with C≤1.

As a result, it means that if the obtained quantity m is 160 g, m is closer to $M_3$ that is 150 g and the temperature to be applied at $t_1$ is $T_{M3@t1} + [(T_{M4@t1} - T_{M3@t1}) \cdot C \cdot (160 - 150)/50]$.

But, if the obtained quantity m is 180 g, m is closer to $M_4$ that is 200 g and the temperature to be applied at $t_1$ is $T_{M4@t1} - [(T_{M4@ti} - T_{M3@ti}) \cdot C \cdot (200 - 180)/50]$.

In general, if the quantity provided by the measuring device is a volume and not a weight, the weight can be deduced indirectly from an average density of coffee beans or more preferably, the identification of the nature of the beans provides access to the exact density of said beans enabling the calculation of the weight of beans introduced in the vessel.

In the step of processing the output, the processing unit 18 operates the heating device 12 usually in a closed-loop control using the input signal from the temperature sensor 231 as feedback to apply the temperature versus time profile to the coffee beans corresponding to the determined roasting recipe (R).

Where the processing unit is configured to obtain the type $N_y$ of coffee beans introduced inside the vessel, the control system of the roasting apparatus can be configured to get access, for each of the different types of beans (Beans 1, Beans 2, . . . ) to a series of roasting recipes like, as illustrated in FIG. 5:

the series "Beans 1" (R1;1, R1;2, R1;3 . . . ) adapted to the roasting of different successive pre-determined quantities (M1, M2, M3, . . . ) of coffee beans of type Beans 1, and the series "Beans 2" (R2;1, R2;2, R2;3 . . . ) adapted to the roasting of different successive pre-determined quantities (M1, M2, M3, . . . ) of coffee beans of type Beans 2, and the series "Beans 3" (R3;1, R3;2, R3;3 . . . ) adapted to the roasting of different successive pre-determined quantities (M1, M2, M3, . . . ) of coffee beans of type Beans 3.

In that case, the above described first, second or third embodiment can be implemented to determine the roasting profile of the customised quantity m of beans of type $N_y$ introduced inside the vessel by accessing to the series of roasting recipes ($R_{yi}$, $R_{yi+1}$, . . . ) adapted to the roasting of beans of said type $N_y$. For example, if beans of type Beans 2 are introduced inside the vessel and identified, then the step of determining the roasting profile of a quantity m of Beans 2 is based on the series of roasting profiles (R2;1, R2;2, R2;3 . . . ) as illustrated in FIG. 5.

It is noticed that the invention covers embodiments where, in the different series of curves, the pre-determined quantities Mi, Mi+1, . . . are not the same in all series.

In the same manner, where the processing unit is configured to obtain the type $N_y$ of coffee beans introduced inside the vessel and the further use $u_x$ desired by the operator, the control system of the roasting apparatus can be configured to get access, for each of the different types of beans (Beans 1, Beans 2, . . . ) and for each further use of sais beans (Use 1, Use 2, . . . ) to a series of roasting recipes like, as illustrated in FIG. 5:

series (R1;1;1, R1;1;2+, R1;1;3 . . . ) adapted to the roasting of different successive pre-determined quantities (M1, M2, M3, . . . ) of coffee beans of type Beans 1 for the further Use 1, and series "Beans 1—Use 2" (R1;2;1, R1;2;2, R1;2;3 . . . ) adapted to the roasting of different successive pre-determined quantities (M1, M2, M3, . . . ) of coffee beans of type Beans 1 for the further Use 2, and series "Beans 2—Use 1" (R2;1;1, R2;1;2, R2;1;3 . . . ) adapted to the roasting of different successive pre-determined quantities (M1, M2, M3, . . . ) of coffee beans of type Beans 2 for the further Use 1, and series "Beans 2—Use 2" (R2;2;1, R2;2;2, R2;2;3 . . . ) adapted to the roasting of different successive pre-determined quantities (M1, M2, M3, . . . ) of coffee beans of type Beans 2 for the further Use 2, and series "Beans 3—Use 1" (R3;1;1, R3;1;2, R3;1;3 . . . ) adapted to the roasting of different successive pre-determined quantities (M1, M2, M3, . . . ) of coffee beans of type Beans 3 for the further Use 1, and series "Beans 3—Use 2" (R3;2;1, R33;2;2, R3;2;3 . . . ) adapted to the roasting of different successive pre-determined quantities (M1, M2, M3, . . . ) of coffee beans of type Beans 3 for the further Use 2.

System

FIG. 7a illustrates a system 10 of a roasting apparatus 1 and a measuring device 4, preferably a scale. The roasting apparatus comprises a vessel 11 configured for holding beans during the roasting operation. The measuring device 2 is configured to measure the quantity of coffee beans and to communicate the measured quantity input 22 through a communication interface to the control system 180 of the roasting apparatus.

FIG. 7b illustrates an alternative system 10 of a roasting apparatus 1 and a measuring device 4, preferably a scale. The measuring device 2 is part of the roasting apparatus, precisely it is integrated in the same frame as the roasting apparatus, aside from the roasting apparatus. The measuring device 2 is configured to measure the quantity of coffee beans and to communicate the measured quantity input 22 to the control system 180 of the roasting apparatus.

FIG. 7c illustrates an alternative system 10 of a roasting apparatus 1 and a measuring device 4. The measuring device 4 is part of the roasting apparatus. In one mode, the measuring device can be a scale, and, in its roasting position, the vessel 11 can be suspended to the scale. In that mode, the vessel is weighted before the vessel is completely locked in the roasting apparatus to apply roasting.

In another mode, the measuring device can be a level sensor, and, in its roasting position, the level of beans can be measured. The measuring device 2 is configured to communicate the measured quantity as an input 22 to the control system 180 of the roasting apparatus.

FIG. 7d illustrates an alternative system 10 of a roasting apparatus 1 and a measuring device 4. The measuring device 4 is a scale that is part of the roasting apparatus. Precisely in its roasting position, the vessel 11 lays on the scale. The scale 4 is configured to weight coffee beans and to communicate the measured weight as an input 22 to the control system 180 of the roasting apparatus. Then the vessel is locked inside the roasting apparatus and roasting can be applied.

FIG. 8 illustrates a system 100 where the roasting apparatus 10 and the measuring apparatus 4 are physically separated. In this system, the coffee beans 5 are introduced and measured in an intermediate container 6 before being introduced inside the vessel 11 of the roasting apparatus 1.

This system is particularly useful when the vessel is not removable form the roaster, for example in case of drum roasters.

The measuring device 6 is connected through a cable (USB, Serial) to the roasting apparatus and is able to supply the control system of the roasting apparatus with the measured quantity of beans 22. Alternatively, the connection can be established through Wi-Fi or Bluetooth.

FIG. 9 provides an alternative embodiment of the system of FIG. 8 where the vessel 11 is removable from the roasting apparatus and can be placed on the measuring apparatus 4 in filling and measuring position before being positioned back on the roasting apparatus in a roasting position. Preferably the measuring apparatus 4 comprises a receiving area configured for holding the vessel 11 of a roasting apparatus so that it is securely hold during filling and measuring. For example, the measuring device can present an interface matching with the bottom of the vessel. Preferably, the measuring device is configured to automatically provide the weight of beans without the tare weight of the vessel.

The roasting apparatus of the present invention presents the advantage of providing the operator with flexibility in terms of quantity of beans to be roasted while guaranteeing a constant quality of roasting.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roaster 1
roasting unit 10
vessel 11
levels 111a, 111b
handle 112
heating device 12
air flow driver 121
heater 122
motor 13
perforated plate 14
housing 15
base 151
body 152
air inlet 153
feet 154
chaff collector 16
cover 17
processing unit 18
control system 180
memory 19
user interface 20
power supply 21
measured quantity input 22
sensor 23
temperature sensor 231
communication interface 24
database 25
measuring device 2
measured quantity input 22
code reader 3
measuring device 4
coffee beans 5
intermediate container 6
system 100

The invention claimed is:

1. An apparatus for roasting coffee beans, the apparatus comprising:
a vessel to contain coffee beans;
a heating device to heat coffee beans contained in the vessel; and
a control system operable to control the heating device and configured to apply a roasting recipe providing the temperature $T_{@t1}$, $T_{@t2}$, ... to be applied at discrete successive times $t_1$, $t_2$, ..., respectively,
wherein, for a customised quantity m of coffee beans introduced inside the vessel,
the control system is configured to obtain at least the quantity m of coffee beans introduced inside the vessel, and
the control system is configured to get access to at least one series of roasting recipes ($R_i$, $R_{i+1}$, ...) adapted to the roasting of different successive pre-determined quantities ($M_i$, $M_{i+1}$, ...) of beans of same type and to the pre-determined quantities Mi, Mi+1, ..., and
based on the accessible series of roasting recipes ($R_i$, $R_{i+1}$, ...) adapted to the roasting of different successive pre-determined quantities ($M_i$, $M_{i+1}$, ...) of beans of same type and based on the obtained quantity m of coffee beans introduced inside the vessel, the control system is configured to determine the roasting recipe to be applied on the obtained quantity m of coffee beans introduced inside the vessel,
wherein the control system is configured to determine the roasting recipe to be applied on the quantity m of coffee beans introduced inside the vessel from one or two recipes of the at least one accessible series of roasting recipes ($R_i$, $R_{i+1}$, ...), each of the one or two recipes being adapted to the roasting of one pre-determined quantity of beans respectively and the pre-determined quantity or quantities of beans presenting the smallest difference(s) of quantity with the obtained quantity m.

2. An apparatus for roasting coffee beans, the apparatus comprising:
a vessel to contain coffee beans;
a heating device to heat coffee beans contained in the vessel; and
a control system operable to control the heating device and configured to apply a roasting recipe providing the temperature $T_{@t1}$, $T_{@t2}$, ... to be applied at discrete successive times $t_1$, $t_2$, ..., respectively,
wherein, for a customised quantity m of coffee beans introduced inside the vessel,
the control system is configured to obtain at least the quantity m of coffee beans introduced inside the vessel, and
the control system is configured to get access to at least one series of roasting recipes ($R_i$, $R_{i+1}$, ...) adapted to the roasting of different successive pre-determined quantities ($M_i$, $M_{i+1}$, ...) of beans of same type and to the pre-determined quantities Mi, Mi+1, ..., and
based on the accessible series of roasting recipes ($R_i$, $R_{i+1}$, ...) adapted to the roasting of different successive pre-determined quantities ($M_i$, $M_{i+1}$, ...) of beans of same type and based on the obtained quantity m of coffee beans introduced inside the vessel, the control system is configured to determine the roasting recipe to be applied on the obtained quantity m of coffee beans introduced inside the vessel,
wherein the control system is configured to determine the roasting recipe to be applied on the quantity m of coffee beans introduced inside the vessel by selecting one of the recipes of the at least one accessible series of roasting recipes ($R_i$, $R_{i+1}$, ...), and
the selection comprising identifying the roasting recipe ($R_i$) adapted to the roasting of a pre-determined quantity ($M_i$) of beans, the pre-determined quantity of beans presenting the smallest difference of quantity with the obtained quantity m.

3. An apparatus for roasting coffee beans, the apparatus comprising:
a vessel to contain coffee beans;
a heating device to heat coffee beans contained in the vessel; and a control system operable to control the heating device and configured to apply a roasting recipe providing the temperature $T_{@t1}, T_{@t2}, \ldots$ to be applied at discrete successive times $t_1, t_2, \ldots$, respectively, wherein, for a customised quantity m of coffee beans introduced inside the vessel, the control system is configured to obtain at least the quantity m of coffee beans introduced inside the vessel, and the control system is configured to get access to at least one series of roasting recipes ($R_i, R_{i+1}, \ldots$) adapted to the roasting of different successive pre-determined quantities ($M_i, M_{i+1}, \ldots$) of beans of same type and to the pre-determined quantities Mi, Mi+1, . . . , and based on the accessible series of roasting recipes ($R_i, R_{i+1}, \ldots$) adapted to the roasting of different successive pre-determined quantities ($M_i, M_{i+1}, \ldots$) of beans of same type and based on the obtained quantity m of coffee beans introduced inside the vessel, the control system is configured to determine the roasting recipe to be applied on the obtained quantity m of coffee beans introduced inside the vessel, wherein the control system is configured to determine the roasting recipe to be applied on the quantity m of coffee beans introduced inside the vessel by:

identifying in the at least one series of roasting recipes the two accessible roasting recipes $R_i$ and $R_{i+1}$ adapted to the roasting of two successive pre-determined quantities $M_i$ and $M_{i+1}$ of beans respectively, wherein the quantity m is comprised between the two successive pre-determined quantities $M_i$ and $M_{i+1}$, and from the two identified roasting recipes $R_i$ and $R_{i+1}$, the roasting recipes $R_i$ and $R_{i+1}$ providing the temperatures $T_{Mi@t1}, T_{Mi@t2}, \ldots$ and $T_{Mi+1@t1}, T_{Mi+1@t2}, \ldots$ respectively applied at discrete successive times $t_1, t_2, \ldots$, and determining the temperature $T_{m@t1}, T_{m@t2}, \ldots$ to be applied to the obtained quantity m of beans at each of the discrete successive times $t_1, t_2, \ldots$ as follows:

$$T_{m@tx}=T_{Mi@tx}+[(T_{Mi+1@tx}-T_{Mi@tx}) \cdot C \cdot (m-M_i)/(M_{i+1}-M_i)]$$

with $C \leq 1$.

4. The apparatus for roasting coffee beans according to claim 3, wherein C equals 1.

5. An apparatus for roasting coffee beans, the apparatus comprising:

a vessel to contain coffee beans;

a heating device to heat coffee beans contained in the vessel; and a control system operable to control the heating device and configured to apply a roasting recipe providing the temperature $T_{@t1}, T_{@t2}, \ldots$ to be applied at discrete successive times $t_1, t_2, \ldots$, respectively, wherein, for a customised quantity m of coffee beans introduced inside the vessel, the control system is configured to obtain at least the quantity m of coffee beans introduced inside the vessel, and the control system is configured to get access to at least one series of roasting recipes ($R_i, R_{i+1}, \ldots$) adapted to the roasting of different successive pre-determined quantities ($M_i, M_{i+1}, \ldots$) of beans of same type and to the pre-determined quantities Mi, Mi+1, . . . , and based on the accessible series of roasting recipes ($R_i, R_{i+1}, \ldots$) adapted to the roasting of different successive pre-determined quantities ($M_i, M_{i+1}, \ldots$) of beans of same type and based on the obtained quantity m of coffee beans introduced inside the vessel, the control system is configured to determine the roasting recipe to be applied on the obtained quantity m of coffee beans introduced inside the vessel, wherein the control system is configured to determine the roasting recipe to be applied on the quantity m of coffee beans introduced inside the vessel by:

identifying in the at least one series of roasting recipes the two accessible roasting recipes $R_i$ and $R_{i+1}$ adapted to the roasting of two successive pre-determined quantities $M_i$ and $M_{i+1}$ of beans respectively, wherein the quantity m is comprised between these two successive pre-determined quantities Mi and Mi+1, and from the two identified roasting recipes $R_i$ and $R_{i+1}$ respectively, providing the temperatures $TMi_{@t1}, T_{Mi@t2}, \ldots$ and $T_{Mi+1@t1}, T_{Mi+1@t2}, \ldots$ respectively applied at discrete successive times $t_1, t_2, \ldots$, determining the temperature $T_{m@t1}, T_{m@t2}, \ldots$ to be applied to the obtained quantity m of beans at each of the discrete successive times $t_1, t_2, \ldots$ as follows:

if m is closer to $M_i$, then $T_{m@tx}=T_{Mi@tx}+[(T_{Mi+1@tx}-T_{Mi@tx}) \cdot C \cdot (m-M_i)/(M_{i+1}-M_i)]$ if m is closer to $M_{i+1}$, then $T_{m@tx}=T_{Mi+1@tx}-[(T_{Mi+1@tx}-T_{Mi@tx}) \cdot C \cdot (M_{i+1}-m)/(M_{i+1}-M_i)]$ with $C<1$.

6. The apparatus for roasting coffee beans according to claim 5, wherein C equals 1.

7. An apparatus for roasting coffee beans, the apparatus comprising:

a vessel to contain coffee beans;

a heating device to heat coffee beans contained in the vessel; and a control system operable to control the heating device and configured to apply a roasting recipe providing the temperature $T_{@t1}, T_{@t2}, \ldots$ to be applied at discrete successive times $t_1, t_2, \ldots$, respectively, wherein, for a customised quantity m of coffee beans introduced inside the vessel, the control system is configured to obtain at least the quantity m of coffee beans introduced inside the vessel, and the control system is configured to get access to at least one series of roasting recipes ($R_i, R_{i+1}, \ldots$) adapted to the roasting of different successive pre-determined quantities ($M_i, M_{i+1}, \ldots$) of beans of same type and to the pre-determined quantities Mi, Mi+1, . . . , and based on the accessible series of roasting recipes ($R_i, R_{i+1}, \ldots$) adapted to the roasting of different successive pre-determined quantities ($M_i, M_{i+1}, \ldots$) of beans of same type and based on the obtained quantity m of coffee beans introduced inside the vessel, the control system is configured to determine the roasting recipe to be applied on the obtained quantity m of coffee beans introduced inside the vessel, wherein the control system is configured to:

obtain the further use ux of the roasted beans in a list of pre-determined uses (uα, uβ, . . . ), and based on the obtained specific further use ux, to get access at least to a series of roasting recipes (Rxi, Rxi+1, . . . ) adapted to the roasting of different successive pre-determined quantities ($M_i, M_{i+1}, \ldots$) of beans for the specific further use ux, and optionally to a coefficient Cx specific to the use ux of coffee beans, and determine the roasting recipe to be applied on the obtained quantity m of coffee beans, based on the accessible series of roasting recipes (Rxi, Rxi+1, . . . ) adapted to the further use ux of the beans and optionally based on the coefficient Cx.

8. The apparatus according to claim 7, wherein the control system is configured to:
- obtain the type Ny of coffee beans introduced inside the vessel and the further use ux, and
- based on the obtained type Ny and the further use ux, to get access to at least one series of roasting recipes (Ryxi, Ryxi+1, . . . ) adapted to the roasting of different successive pre-determined quantities (Mi, Mi+1, . . . ) of beans for the specific further use ux of the roasted beans of type Ny, and
- determine the roasting recipe to be applied on the obtained quantity m of coffee beans, based on the accessible series of roasting recipes (Rxyi, Rxyi+1, . . . ) adapted to the further use ux of the beans Ny.

9. A method of roasting coffee beans using an apparatus comprising:
- a vessel to contain coffee beans;
- a heating device to heat coffee beans contained in the vessel; and
- a control system operable to control the heating device and configured to apply a roasting recipe providing the temperature $T_{@t1}$, $T_{@t2}$, . . . to be applied at discrete successive times $t_1$, $t_2$, . . . , respectively, wherein, for a customised quantity m of coffee beans introduced inside the vessel,
- the control system is configured to obtain at least the quantity m of coffee beans introduced inside the vessel, and
- the control system is configured to get access to at least one series of roasting recipes ($R_i$, $R_{i+1}$, . . . ) adapted to the roasting of different successive pre-determined quantities ($M_i$, $M_{i+1}$, . . . ) of beans of same type and to the pre-determined quantities Mi, Mi+1, . . . , and
- based on the accessible series of roasting recipes ($R_i$, $R_{i+1}$, . . . ) adapted to the roasting of different successive pre-determined quantities ($M_i$, $M_{i+1}$, . . . ) of beans of same type and based on the obtained quantity m of coffee beans introduced inside the vessel, the control system is configured to determine the roasting recipe to be applied on the obtained quantity m of coffee beans introduced inside the vessel and applying a roasting recipe providing the temperature $T_{@t1}$, $T_{@t2}$, . . . to be applied at discrete successive times $t_1$, $t_2$, . . . , the method comprising:

obtaining the quantity m of coffee beans introduced inside the vessel;

getting access to at least one series of roasting recipes ($R_i$, $R_{i+1}$, . . . ), the recipes being adapted to the roasting of different successive pre-determined quantities ($M_i$, $M_{i+1}$, . . . ) of beans of same type and to the pre-determined quantities Mi, Mi+1, . . . ;

based on the accessible series of roasting recipes ($R_i$, $R_{i+1}$, . . . ) adapted to the roasting of different successive pre-determined quantities ($M_i$, $M_{i+1}$, . . . ) of beans of same type and based on the obtained quantity m of coffee beans introduced inside the vessel, determining the roasting recipe to be applied on the obtained quantity m of coffee beans introduced inside the vessel;

obtaining the further use ux of the roasted beans introduced inside the vessel in a list of pre-determined uses (uα, uβ, . . . );

getting access to at least one series of roasting recipes (Rxi, Rxi+1, . . . ) adapted to the roasting of different successive pre-determined quantities ($M_i$, $M_{i+1}$, . . . ) for the further use ux; and determining the roasting recipe to be applied on the obtained quantity m of coffee beans based on the accessible series of roasting recipes (Rxi, Rxi+1, . . . ) adapted to the further use ux.

* * * * *